United States Patent Office 3,484,203
Patented Dec. 16, 1969

3,484,203
MEASURING PROCESS AND APPARATUS
William Antony Wiseman, The Mill House,
Bray, Berkshire, England
Filed Feb. 6, 1967, Ser. No. 614,302
Claims priority, application Great Britain, Feb. 10, 1966,
5,808/66
Int. Cl. G01n 27/26
U.S. Cl. 23—232                                        6 Claims

ABSTRACT OF THE DISCLOSURE

Process for detection of component in a gas stream by incorporating a reactive gas into the stream using an amplified feedback gas detection signal as a control, reacting the component with the reactive gas, and incorporating additional reactive gas to a level controlled by an amplified gas-detection feedback signal. The work done in the post-reaction incorporation of gas is a measure of the amount of component present. Also provided is an apparatus for conducting this process.

The present invention relates to a process and apparatus for the detection of a component in a gas stream.

In my copending application No. 462,678, now abandoned, is described a method and apparatus for detecting or measuring a component of a gas stream which comprises incorporating a predetermined proportion of a gas reactive with the component to be detected or measured into the gas stream, allowing the component of the mixture to react with the incorporated gas, detecting the presence or amount of the incorporated gas after reaction, using a signal so obtained to control the generation of a compensatory amount of the gas reactive with the component to be measured, and feeding the compensatory amount of gas into the detector, and detecting or measusing work done in the generation of the compensatory amount of gas.

It has now been found that improvements in this method and apparatus may be obtained by operating the system such that a predetermined proportion of the gas reactive with the component to be detected is present or introduced into the gas stream, passing the gases through a reactor, then introducing further amounts of the reactive gas into the stream from an electrically operable source and finally detecting variation in the amount of gas in the stream from the standard and using the signal obtained to feed a compensatory amount of gas into the stream.

Accordingly the present invention is for a method of detecting or measuring a component of a gas stream which comprises ensuring the presence in the gas stream of a predetermined amount of a gas reactive with the component to be detected, hereinafter called the reactive gas, passing the gas stream through a reactor to effect reaction between the component to be detected and the reactive gas, thereafter introducing into the gas stream amounts of the reactive gas from an electrically operable source and finally detecting variation in the amount of reactive gas from standard, using the signal so obtained to feed a compensatory amount of reactive gas from the electrically operable source into the stream, and employing the work done by the electrically operable source as a measure of the component to be detected.

The present invention is also for an apparatus for detecting or measuring a component of a gas stream which comprises a conduit for the gas stream, a reactor adapted for the reaction of said component and a reactive gas, an electrically operable source for said reactive gas and a detector, wherein the detector detects variation in amount of the reactive gas from standard producing an electric signal, the electric signal being amplified and fed back to the electrically operable source to produce a compensatory amount of the reactive gas, the current flow being used as a measure of the component to be detected.

The detector which is employed must be specific for the reactive gas, and the reaction between the reactive gas and the component to be detected must be quantitative, and desirably rapid.

Oxygen is a particularly suitable reactive gas, and there are a number of well known detectors for oxygen such as the Hersch cell, as described in British Patents 707,323, 750,254 and 913,473, a solid electrolyte (e.g. zirconia) cell, and devices based on the paramagnetic properties of oxygen. Other oxygen detectors may also be used.

Other reactive and detectable gases can be used such as hydrogen, chlorine and the like.

The reactor may comprise any suitable reactor for the reaction between the reactive gas and the component to be detected. When oxygen is the reactive gas, this is a combustion chamber which may be heated for example to 800°–1000° C.

It is preferred to use an electrolytic generator as the electrically operable source to produce the compensatory amounts of the reactive gas; such electrolytic generators may be any of the generators known in the art. Other types of electrically operable sources may be used, for example an electrically operated metering valve connected with a supply of the reactive gas, suitably under pressure, or an electrically operated piston displacement device, for example a piston moving in a tube containing the reactive gas.

The gas stream containing the component to be measured requires to contain an amount of the reactive gas at least sufficient to react with the whole of the component present. Where the reactive gas is oxygen, this may be present as pure oxygen or as air or as a mixture of oxygen and an inert gas. It is desirable that the gas stream fed to the reactor contains a constant amount of the reactive gas, and in order to obtain this, it is convenient to use a system comprising an electrolytic generator for the reactive gas, a detector which detects variation in amount of the reactive gas from standard producing an electric signal is amplified and fed back to the electrolytic generator to produce a compensatory amount of the reactive gas. Such a system is illustrated in FIGURE 2 and described in detail below.

The reactor in the system according to the present invention is not involved in the feed-back loop, and consequently can be as large as desired. The reactive gas generator and detector may be together in a single chamber, or immediately succeeding one another so that the dead volume between is microscopic.

For convenience specific embodiments of the invention are shown in the accompanying drawing solely by way of illustration. By way of example these are described with reference to oxygen as the reactive gas, and for convenience the electrically operable source is referred to as the generator.

Figure 1:
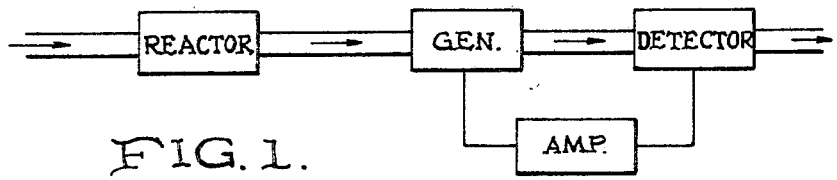
FIGURE 1 is a block diagram of one system according to the present invention.

According to the system shown in FIGURE 1, the gas stream is passed in the direction of the arrow through the reactor, which is a combustion chamber. The gas stream contains sufficient oxygen for combustion of the component to be detected. The gas stream passes to the generator, which is an electrolytic oxygen generator, and then the oxygen detector. The detector responds to variation in the oxygen level from standard, and is coupled with the generator through the amplifier. Detection of variation in the oxygen level causes generation of a compensatory amount of oxygen at the generator. The component to be detected is measured by the current flow through the amplifier which can be used for measuring and/or control purposes.

If the gas stream contains insufficient oxygen, air or oxygen may be added to the gas stream before the reactor. It is, however, desirable for the gas stream to contain a constant level of oxygen.

Figure 2:
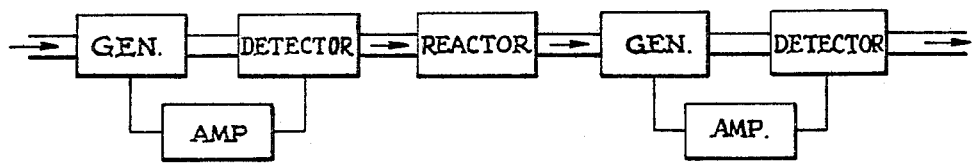
FIGURE 2 is a block diagram of another system according to the present invention.
Figure 4:
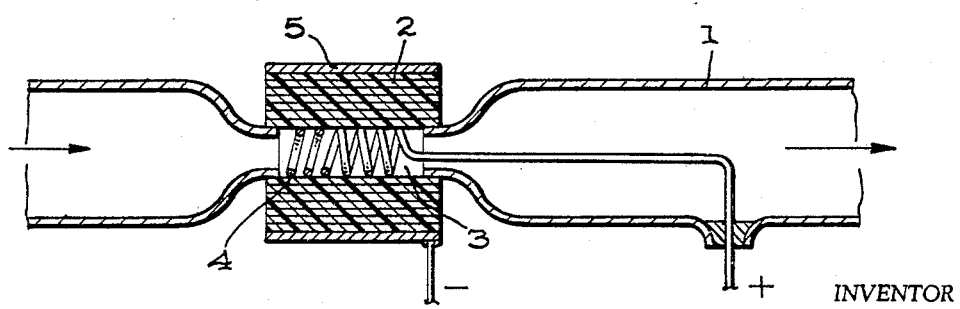
FIGURE 4 is a diagram of an electrolytic oxygen producing cell.

A modified system is shown in FIGURE 2, where the arrangement from the reactor onwards is the same as in FIGURE 1. The system includes additionally an arrangement to ensure that the gas stream fed to the reactor contains a constant amount of oxygen. This is provided by the generator and detector coupled through the amplifier. The generator is an electrolytic generator for oxygen (for example as shown in FIGURE 4), and the detector is an oxygen detector. The oxygen detector detects variation in the amount of the reactive gas from standard, producing an electric signal, which is amplified by the amplifier, and fed back to the electrolytic generator to produce a compensatory amount of oxygen. With this system the oxygen level of the gas entering the reactor is constant.

Figure 3:
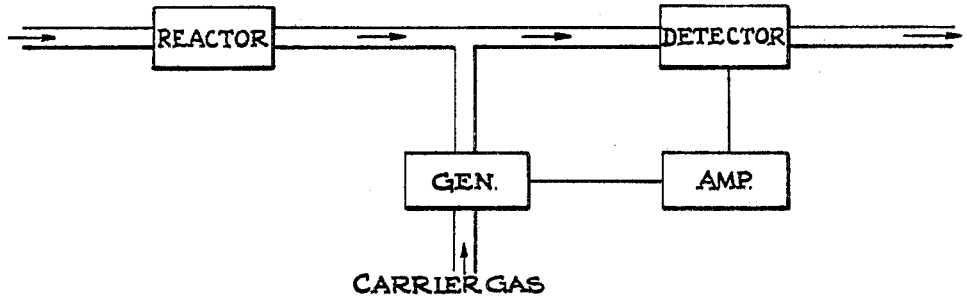
FIGURE 3 is a block diagram of another system according to the present invention.

Another modified system is shown in FIGURE 3, where a carrier gas is employed for the introduction of the oxygen. The modification may be applied to the system shown in FIGURE 1 or 2, wherein the generator in FIGURE 1 and the second generator in FIGURE 2 introduces oxygen into a secondary inert carrier gas line which joins with the main gas stream between the reactor and the detector. The carrier gas is suitably introduced at a constant rate, and is suitably nitrogen.

One form of oxygen generating cell is shown in FIGURE 4. This is situated in a gas flow conduit 1 and consists of a tight roll of porous polyvinyl chloride sheet 2 having a central axial hole 3 containing a coil 4 of 35 gauge platinum wire wound into a coil of 0.8 mm. inside diameter and 0.5 mm. pitch. Around the outside of the roll is wrapped a silver gauze 5. In use the roll 2 of porous polyvinyl chloride is impregnated with electrolyte (for example 6 N sulphuric acid), however, no electrolyte remaining on the surface. With silver gauze 5 as cathode and platinum coil 4 as anode, oxygen is generated in the gas stream passing through conduit 1. The whole generator may be coated with a depolariser to avoid external formation of hydrogen.

I claim:
1. A method of detecting a component in a gas stream comprising (1) generating a gas reactive with said component by electrolytic means, (2) incorporating at least part of the reactive gas into said gas stream, (3) detecting any variation in the amount of the reactive gas from a predetermined standard by means producing an electric signal, (4) amplifying said signal, (5) electrically feeding back said amplified signal to control the electrolytic generation of a compensatory amount of said reactive gas, whereby the proportion of reactive gas in said gas stream is kept constant, (6) passing said gas stream containing a constant proportion of reactive gas through a reactor to effect reaction between said component and said reactive gas, (7) incorporating into the reacted gas stream an additional electrolytically generated amount of the reactive gas, (8) detecting any variation in the amount of the reactive gas thereafter present from the predetermined standard by means producing an electrical signal, (9) amplifying said signal, (10) electrically feeding back said amplified signal to control the electrolytic generation of a further compensatory amount of said reactive gas, whereby the proportion of said reactive gas in said reacted gas stream is kept constant and (11) utilizing the current flow produced by said latter electrolytic generation as a measure of the component to be detected.

2. A method as claimed in claim 1 wherein the reactive gas is oxygen.

3. Apparatus for detecting a component in a gas stream, comprising:
 (1) a conduit for the gas stream,
 (2) a first electrolytic gas generator generating a gas reactive with said component and having means for introducing said reactive gas into the gas stream,
 (3) a first associated gas detector for the reactive gas, said detector including means for producing an electrical signal, and said detector being disposed in the conduit downstream of the generator,
 (4) a first amplifier for said signal electrically connected intermediate to the first generator and first detector to control the operation of said first generator to maintain a constant amount of reactive gas,
 (5) a reactor disposed in the conduit downstream of the first detector for effecting reaction between said component and said reactive gas,
 (6) a second electrolytic gas generator generating a gas reactive with said component and having means for introducing said reactive gas into the gas stream,
 (7) a second associated gas detector for the reactive gas, said detector including means for producing an electrical signal, and said detector being disposed in the conduit downstream of the second generator,
 (8) a second amplifier for said latter signal, electrically connected intermediate to the second generator and second detector to control the operation of said second generator to maintain a constant amount of reactive gas, and
 (9) means connected to the second generator for measuring current flow in said second generator.

4. Apparatus as claimed in claim 3 wherein each generator and its associated detector are located in a single chamber.

5. Apparatus as claimed in claim 3 wherein each generator and its associated detector immediately succeed one another so that the dead volume between them is negligible.

6. Apparatus as claimed in claim 3 wherein each generator is an oxygen generator and each detector is an oxygen detector.

References Cited

UNITED STATES PATENTS

| | | |
|---|---|---|
| 2,734,376 | 2/1956 | Cherry et al. |
| 2,762,568 | 9/1956 | Sullivan. |
| 2,805,191 | 9/1957 | Hersch _____ 23—232 |
| 3,010,801 | 11/1961 | Schulze _____ 23—254 XR |
| 3,096,157 | 7/1963 | Brown et al. _____ 23—254 XR |
| 3,240,554 | 3/1966 | Angerhofer. |
| 3,342,558 | 9/1967 | Reinecke _____ 23—254 XR |

OTHER REFERENCES

Walker et al.: "Principles of Chemical Engineering" (1927), pp. 23–24.

MORRIS O. WOLK, Primary Examiner.

R. E. SERWIN, Assistant Examiner

U.S. Cl. X.R.

23—254